(12) United States Patent
Hafeez et al.

(10) Patent No.: US 6,920,191 B2
(45) Date of Patent: Jul. 19, 2005

(54) ESTIMATION AND COMPENSATION OF THE PULSE-SHAPE RESPONSE IN WIRELESS TERMINALS

(75) Inventors: Abdulrauf Hafeez, Cary, NC (US); Karl James Molnar, Cary, NC (US)

(73) Assignee: Telefonaktiebolaget LM Ericsson (publ) (SE)

( * ) Notice: Subject to any disclaimer, the term of this patent is extended or adjusted under 35 U.S.C. 154(b) by 576 days.

(21) Appl. No.: 09/773,889

(22) Filed: Feb. 2, 2001

(65) Prior Publication Data

US 2002/0150184 A1 Oct. 17, 2002

(51) Int. Cl.[7] .............................................. H04B 1/10
(52) U.S. Cl. ..................................................... 375/346
(58) Field of Search ................................ 375/316, 346, 375/350, 340, 343, 130, 140, 147, 143, 152

(56) References Cited

U.S. PATENT DOCUMENTS

| | | | |
|---|---|---|---|
| 5,680,419 A | 10/1997 | Bottomley | 375/347 |
| 5,838,739 A | 11/1998 | Ramesh et al. | 375/348 |
| 5,867,538 A | 2/1999 | Liu | |
| 5,889,827 A * | 3/1999 | Bottomley et al. | 375/350 |
| 6,084,929 A | 7/2000 | Molnar et al. | |
| 6,381,291 B1 * | 4/2002 | Yom | 375/350 |
| 6,438,567 B2 * | 8/2002 | Schollhorn | 708/313 |
| 2001/0053972 A1 * | 12/2001 | Amada et al. | 704/220 |

FOREIGN PATENT DOCUMENTS

| | | | |
|---|---|---|---|
| EP | 0518835 A1 | 12/1992 | |
| WO | 98/59471 | 12/1998 | |
| WO | 00/13383 | 3/2000 | |
| WO | WO-00/13383 * | 3/2000 | H04L/25/03 |
| WO | 01/06683 A1 | 1/2001 | |
| WO | 06 5719 | 8/2002 | |

OTHER PUBLICATIONS

"Adaptive Rays and MLSE Equalization"; Gregory E. Bottomley et al.; Proc. IEEE VTS 45th Vehicular Technology Conference; Jul. 1995; pp. 50–54.
"Co–Channel Interference Cancellation for D–AMPS Handsets"; Abdulrauf Hafeez et al.; Proc. IEEE VTS 49th Vehicular Technology Conference; May 1999.
"Improved Channel Estimation With Side Information"; A.S. Khayrallah et al.; Proc. IEEE VTS 47th Vehicular Technology Conference; May 1997; pp. 1049–1053.
U.S. Appl. No. 09/143,821, filed Aug. 31, 1998, entitled "Methods and Systems for Reducing Co–Channel Interference Using Multiple Timings for a Received Signal".
U.S. Appl. No. 08/897,309, filed Jul. 21, 1997, entitled "System and Methods for Selecting an Appropriate Detection Technique in a Radiocommunication System".
Jones, David C. et al., "Pulse Shape and Linearity Testing of ISDN Basic Access Transceivers," Supercomm/ICC '92, Jun. 14–18, 1992, pp. 799–804.

* cited by examiner

Primary Examiner—Kevin Burd
(74) Attorney, Agent, or Firm—Coats & Bennett, P.L.L.C.

(57) ABSTRACT

A pulse-shape estimator calculates an impulse response for the transmit and receive pulse-shaping filters in a mobile wireless terminal. The pulse-shape estimator receives a training signal that has passed through the pulse-shaping filters and known training symbols. Based on the actual received signal containing the training symbols and the expected received signal, the pulse-shape estimator estimates the impulse response of the pulse-shaping filters. The calculated impulse response may be used to improve signal demodulation or to calculate the coefficients for a digital filter applied before demodulation to compensate for pulse-shape distortion.

32 Claims, 2 Drawing Sheets

ESTIMATION AND COMPENSATION OF THE PULSE-SHAPE RESPONSE IN WIRELESS TERMINALS

BACKGROUND OF THE INVENTION

This present invention relates generally to digital wireless communication systems, and more specifically, to the estimation of pulse shaping filters and compensation of signal distortion caused by the pulse-shaping filters in a wireless communication system.

Mobile wireless terminals, such as cellular telephones, use pulse-shaping filters to filter transmit and receive signals. A basic function of the transmit pulse-shaping filter is to limit the bandwidth of the transmitted signal, while the function of the receive pulse-shaping filter is to recover the transmitted signal by filtering out noise and interference.

Knowledge of the response of the pulse-shaping filter can be used to improve the capacity and coverage in certain wireless systems. For example, knowledge of the transmit and receive pulse-shaping filters may be used to cancel interference arising from a co-channel base station by aiding channel estimation and tracking. Additionally, knowledge of the pulse-shaping filters may be used in a GSM (Global System for Mobile Communications) receiver to provide improved channel estimation for MLSE (maximum likelihood sequence estimation) equalization.

Knowledge of the pulse-shaping filters is encompassed in the impulse response. An impulse response is a mathematical function that describes the output waveform that results when the input is excited by a unit impulse function. The impulse response of the cascade of all transmit and receive pulse-shaping filters in a communication system, or the pulse-shape response, can be used to describe the response characteristics of the pulse-shaping filters. In a communication system using partial response signaling (e.g., GSM), the over-all channel impulse response, which is used by demodulators in the wireless terminals to recover the intended signal, consists of the impulse response to the transmission medium (i.e., the medium response) convolved with the pulse-shape response. The over-all channel response for fractional equalization for a full-response signaling system (e.g., the D-AMPS system) can also be broken down into the medium response and the pulse-shape response. Moreover, the channel response for a co-channel interferer not time-aligned with the desired signal, which is used for joint demodulation in an D-AMPS terminal, is also given by the convolution of the interferer's medium response and the pulse-shape response. Estimating the medium response with knowledge of the pulse-shape response is superior to estimating the over-all channel response. This is applicable in all the above-mentioned examples.

The pulse-shape response is largely fixed when the wireless terminal is manufactured. However, due to manufacturing and component variability, the pulse-shape response may not perfectly match the intended pulse-shape response. Additionally, an analog receive filter is susceptible to temperature variation and aging which may cause it to change in time. Distortion in the pulse-shape response may cause inter-symbol interference (ISI) and/or adjacent channel interference (ACI). Moreover, the disparity between the assumed and actual receive filters may lead to a performance loss in the above discussed techniques that rely on the pulse-shape response.

BRIEF SUMMARY OF THE INVENTION

In accordance with the invention as embodied and broadly described herein, the impulse response of a receive circuit in a wireless mobile terminal is estimated.

One aspect of the present invention comprises receiving a wireless signal and filtering the signal with a receive filter. The impulse response of the receive filter is estimated based on the filtered signal and on an expected version of the signal.

A second aspect of the present invention is related to a system comprising a receive filter, a sampler, and a pulse shape estimator. The receive filter is configured to filter an input signal corresponding to a received version of a plurality of training symbols. The pulse-shape estimator calculates an estimated impulse response of the receive filter based on the received signal and on an expected version of the plurality of training symbols.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION OF THE INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Figure 1:
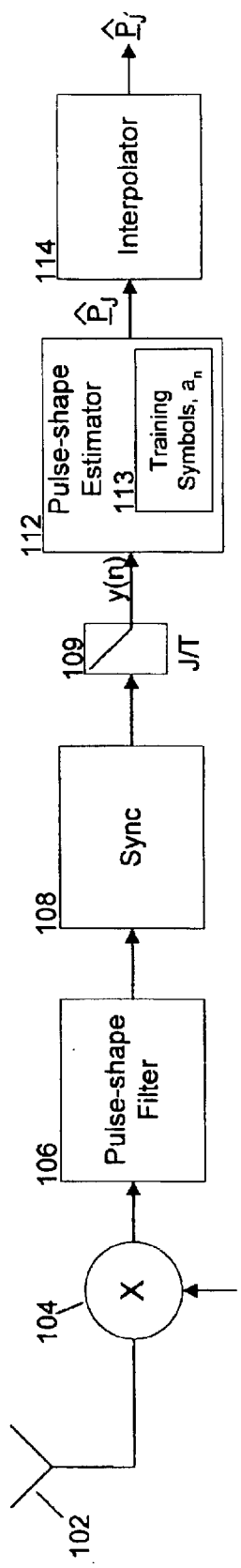
FIG. 1 is a block diagram illustrating a system for calculating the pulse-shape response in a receive circuit.

FIG. 1 is a block diagram illustrating a system for estimating the pulse-shape response in a TDMA (time division multiple access) wireless mobile terminal. The system includes a number of elements connected in series, including: an antenna 102, a downconverter 104, a pulse-shape receive filter 106, a synchronizer 108, a sampler 109, a pulse-shape estimator 112, and an interpolator 114.

Radio signals are received by antenna 102 and downconverted to a baseband signal by downconverter 104. The baseband signal then passes through pulse-shaped receive filter 106 and then through synchronizer 108, which determines the optimum sampling period for the signal.

Information within time slots of a TDMA signal are transmitted in units of information called symbols. The symbols are transmitted at a predetermined symbol rate (illustrated as period T in FIG. 1). For example, in the IS136 standard, the symbol rate is 24.3 kilo-symbols per second. The signal output from synchronizer 108 is sampled by sampler 109 at J times the symbol rate, where J is a positive integer, to generate a sampled received signal y(n), which has a period of J/T.

Antenna 102, downconverter 104, pulse-shaping receive filter 106, synchronizer 108, and sampler 109 are all well known in the implementation of wireless mobile terminals. Accordingly, additional details relating to the construction of these components will not be given herein.

Pulse-shaped estimator 112 estimates the impulse response (i.e., the pulse-shape response), labeled as $$\hat{p}_J$$

in FIG. 1, of the cascade of the transmit filter and receive filter 106, based on the sampled received signal y(n). The pulse-shape response may be interpolated to have a higher effective sampling rate, labeled as signal $$\hat{p}_{J'}$$

by optional interpolator 114. Pulse shaped estimator 112 and interpolator 114 will be described in more detail below.

During a pulse-shape estimation period by pulse-shape estimator 112, training symbols are received by antenna 102. The training symbols define a predetermined symbol pattern, and the sampled received signal y(n) thus corresponds to the received version of the training symbols. Pulse-shape estimator 112 stores a known version of the training symbols 113, which may be stored in a memory. In general, by comparing the sampled received signal y(n), which corresponds to the training symbols after transmission and processing by downconverter 104 and receive filter 106, to the expected pre-stored training symbols 113, pulse-shape estimator 112 estimates the pulse-shape response of the receive filter 106. The details of this comparison are given below with reference to equations (1)–(9).

The sampled received signal for slot m, $y_m(n)$ may be modeled as:

$$y_m(n) = g_m \sum_{i=-\frac{M-1}{2}}^{\frac{M-1}{2}} p(i) a'_{n-i} + w_m(n) \quad (1)$$

where $g_m$ is a flat faded medium response coefficient for slot m, p(i) is the pulse shape response of length M samples (M is assumed odd for illustration), and $w_m(n)$ is an additive noise process. The impairments of additive noise and flat fading are well known in the art and are described, for example, in the book "Digital Communications," by J. G. Proakis, 2nd Ed., New York, McGraw-Hill, 1989. Additionally, $$a'_n = \begin{cases} a_{n/J} & n = 0, J, 2J, \ldots \\ 0 & \text{otherwise} \end{cases} \quad (2)$$

where $a_n$ are the known training symbols 113.

The model of equation (1) can be rewritten in a vector format as $$\underline{y}_m = g_m A \underline{p} + \underline{w}_m \quad (3)$$

where $\underline{y}_m$ is the received signal vector for slot m of length (JN−M+1) samples, which correspond to N training symbols $\{a_0, a_1, \ldots, a_{N-1}\}$. The vectors $\underline{y}_m$ and $\underline{w}_m$ may then be given by $$\underline{y}_m = \left[ y_m\left(\frac{M-1}{2}\right), \ldots, y_m\left(JN - \frac{M+1}{2}\right) \right]^T, \quad (4)$$

$$\underline{w}_m = \left[ w_m\left(\frac{M-1}{2}\right), \ldots, w_m\left(JN - \frac{M+1}{2}\right) \right]^T, \quad (5)$$

the pulse-shape vector $\underline{p}$ may be given by $$\underline{p} = \left[ p\left(\frac{-M+1}{2}\right), \ldots, p\left(\frac{M-1}{2}\right) \right]^T, \quad (6)$$

and the (JN−M+1) by M matrix A may be given by $$A = \begin{bmatrix} a'_{M-1} & a'_{M-2} & \cdots & a'_0 \\ a'_M & a'_{M-1} & \cdots & a'_1 \\ \vdots & \vdots & & \vdots \\ a'_{JN-1} & a'_{JN-2} & \cdots & a'_{JN-M} \end{bmatrix}. \quad (7)$$

From equation (3), the pulse-shape vector estimate for slot m $$\hat{\underline{p}}_m$$

may be derived using:

$$\hat{\underline{p}}_m = (A^H A)^{-1} A^H \underline{y}_m, \quad (8)$$

where the superscript H stands for Hermitian transpose. The final pulse-shape estimate $$\hat{\underline{p}}$$

may then be calculated by:

$$\hat{\underline{p}} = \sum_{m=1}^{K} \hat{\underline{p}}_m \hat{p}_m(0)^*. \quad (9)$$

In operation, pulse-shape estimator 112 calculates an estimated pulse-shape response corresponding to filter 106 using equation (9), known training symbols 113 and the sampled received signal $\underline{y}_m$ obtained over the training period for a few slots (called K).

The pulse-shape estimate $$\hat{\underline{p}}$$

is a vector that consists of a series of coefficients corresponding to the sampling rate J/T. It may, however, be desirable to obtain the pulse-shape coefficients at a sampling rate higher than J/T. If the baseband signal bandwidth, W, is less than J/2T, then interpolator 114 may interpolate $$\hat{\underline{p}}$$

to obtain a signal with a higher sampling rate, J'/T. Interpolator 114 may be implemented as a low-pass filter with a cut-off frequency between W and J/2T followed by a J'/T-rate sampler.

In the implementation described above, known training symbols 113 are stored in a memory in pulse-shape estimator 112. Alternatively, however, the training symbols 113 may be detected by a demodulator that receives the received sampled signals y(n). If training symbols are not available, data symbols may then be fed back to pulse-shape estimator 112 and used in lieu of training symbols 113.

The pulse-shape estimate which is calculated by the pulse-shape estimator 112 may be used in a number of different ways. At the factory, a test signal can be generated using an ideal (or accurate) pulse-shaping filter. The signal can be used by a mobile wireless terminal to calculate the combined response of the transmit filter and receive filter 106. Based on the calculated pulse-shape estimate $$\hat{p},$$

the factory may adjust receive filter 106 directly or adjust the coefficients of a programmable digital FIR filter used in cascade with receive filter 106. Alternatively, pulse-shape estimator 112 may be used to periodically update pulse-shape estimate $$\hat{p}$$

during the life of the wireless terminal. The final pulse-shape estimate $$\hat{p}$$

may be obtained by maximum-ratio-combining the faded pulse-shape estimates over several slots as in equation (9). The estimate can also be obtained by smoothing over multiple slots using a forgetting factor $\lambda$ as $$\hat{p}_{m+1,s} = \lambda \hat{p}_{m,s} + (1-\lambda)\hat{p}_m \hat{p}_m(0)^*, \qquad (10)$$

where the subscript s denotes the smoothed estimate.

Those skilled in the art will recognize that a certain amount of dispersion can be tolerated in the above calculation of $$\hat{p}$$

and the one given in equation (9), although a large amount of dispersion will deteriorate the pulse-shape estimate.

Figure 2:
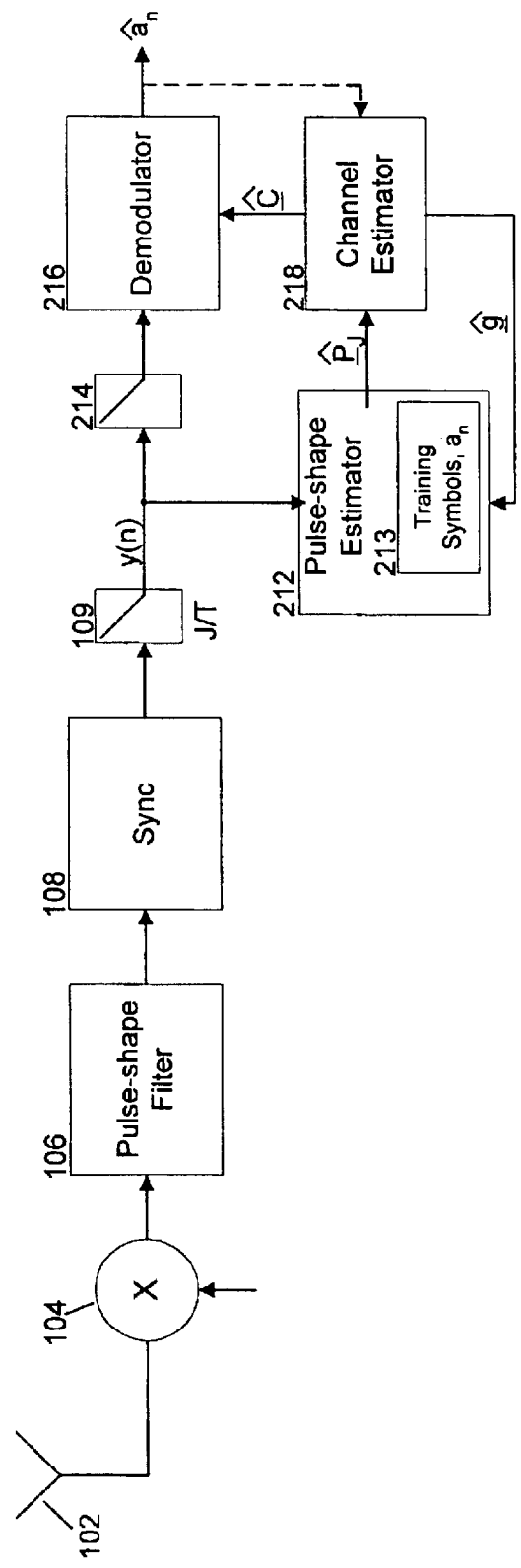
FIG. 2 is a block diagram illustrating a system consistent with the present invention for calculating the pulse-shape response and the channel response in a receive circuit.

FIG. 2 is a block diagram illustrating an alternate system for estimating the pulse-shape response and the channel response in a mobile terminal. This aspect of the present invention may be particularly useful for dispersive signals.

The system illustrated in FIG. 2 includes a number of elements identical to those described in reference to the system described in reference to FIG. 1. In particular, antenna 102, downconverter 104, filter 106, synchonizer 108, and sampler 109 are implemented as described above. Additionally, as shown in FIG. 2, the sampled received signal y(n) is received by pulse-shape estimator 212 and by optional downsampler 214, which may downsample the received signal before it is received by demodulator 216. Demodulator 216 demodulates the transmitted data symbols (i.e., the demodulator separates the data symbols from the carrier wave). Pulse-shape estimator 212 estimates a J times over-sampled pulse-shape response, $$\hat{p}_j,$$

which is received by a channel estimator 218. The channel estimator 218 estimates the overall channel response, $$\hat{c},$$

using the pulse-shape information provided by the pulse-shape estimator 212 and outputs the estimated channel response and the medium response $$\hat{g}.$$

The channel response may be used by the demodulator 216 to enhance demodulation of the data symbols.

The sampled received signal for slot m, $y_m(n)$ may be modeled as:

$$y_m(n) = \sum_{i=\frac{-M+1}{2}}^{\frac{M-1}{2}+K-1} c_m(i) a'_{n-i} + w_m(n) \qquad (11)$$

where $c_m(i)$ is the overall channel impulse response, which is a combination of the medium impulse response and the pulse shape response. More particularly, the overall channel impulse response may be calculated using $$c_m(i) = \sum_{j=\frac{-M+1}{2}}^{\frac{M-1}{2}} p(j) g_m(i-j), \qquad (12)$$

where $\{g_m(i)\}_{i=1}^{K-1}$ is the K-tap transmission medium response. The received signal samples for slot m, corresponding to N training symbols $\{a_0, a_1, \ldots a_{N-1}\}$, may be arranged in a vector of size JN−M−K+2 as follows $$\underline{y}_m = AG_m \underline{p} + \underline{w}_m, \qquad (13)$$

where the vectors $\underline{y}_m$ and $\underline{w}_m$ may be given by $$\underline{y}_m = \left[ y_m\left(\frac{M-1}{2}+K-1\right), \ldots, y_m\left(JN-\frac{M+1}{2}\right) \right]^T, \qquad (14)$$

$$\underline{w}_m = \left[ w_m\left(\frac{M-1}{2}+K-1\right), \ldots, w_m\left(JN-\frac{M+1}{2}\right) \right]^T; \qquad (15)$$

A represents an (JN−M−K+2)×(M+K−1) matrix of training symbols, given by $$A = \begin{bmatrix} a'_{M+K-2} & a'_{M+K-3} & \cdots & a'_0 \\ a'_{M+K-1} & a'_{M+K-2} & \cdots & a'_1 \\ \vdots & \vdots & & \vdots \\ a'_{JN-1} & a'_{JN-2} & \cdots & a'_{JN-M-K+1} \end{bmatrix} \qquad (16)$$

and $G_m$ represents a (M+K−1)×M matrix of medium response coefficients, given by $$G_m = \begin{bmatrix} g_m(0) & 0 & \cdots & 0 \\ g_m(1) & \ddots & \ddots & \vdots \\ \vdots & \ddots & \ddots & 0 \\ g_m(K-1) & & \ddots & g_m(0) \\ 0 & \ddots & & g_m(1) \\ \vdots & \ddots & \ddots & \vdots \\ 0 & \cdots & 0 & g_m(K-1) \end{bmatrix} \quad (17)$$

Based on equation (13), the pulse-shape estimate $$\hat{\underline{p}}_{m+1}$$

for slot m+1 may be obtained using the LMS (least mean squares) algorithm as $$\hat{\underline{p}}_{m+1} = \hat{\underline{p}}_m + \beta \hat{G}_m^H A^H \underline{\varepsilon}_m, \quad (18)$$

where β is the step size of the LMS algorithm, $\hat{G}_m$ is a matrix of estimated medium response coefficients $\hat{g}_m(i)$ for slot m provided by the channel estimator 212 and $\epsilon_m$ is the error signal for slot m, given by $$\underline{\varepsilon}_m = \underline{y}_m - A\hat{G}_m \hat{\underline{p}}_m. \quad (19)$$

The implementation of channel estimator 212 and its associated medium response coefficients $\hat{g}_m(i)$ is well known in the art. One example of an appropriate channel estimator is given in U.S. Pat. No. 5,838,739, titled "Channel Estimator Circuitry and Associated Method for a Digital Communication System."

As described above with reference to FIG. 2, pulse-shape estimator 212 calculates the impulse response of receive filter 106 based on the received sampled signal y(n), the known training symbols 213, and the medium response coefficients received from channel estimator 218. The calculated impulse response may be used by channel estimator 218 to calculate the overall channel response, which may then be used by demodulator 216 in demodulating the received symbols. By calculating the pulse-shape response at pulse-shape estimator 218, the overall channel response determined by channel estimator 218 can be more accurately determined, thus improving the effectiveness of demodulator 216.

One of ordinary skill in the art will recognize that modifications can be made to the system shown in FIG. 2. For example, if training symbols 213 are not available, data symbols obtained from demodulator 216 can be input to pulse-shape estimator 212 and used in calculating the pulse-shape response. Further, algorithms other than the LMS algorithm may be used to minimize the error in the estimated pulse-shape response. Still further, the pulse-shape estimate may be updated only at certain times, such as when the channel conditions are favorable, as may be indicated by a CRC (cyclic redundancy code) check. In the case of multiuser receivers, the training or data symbols of any subset of users (sharing a common pulse-shape) can be used. Moreover, received signal samples obtained at a timing offset from the correct signal timing can be used to obtain pulse-shape estimates for the particular timing offset. This may be useful for multiuser detection of asynchronous user signals, where the received signal is sampled at the timing of one user, while the symbols of another user are employed for pulse-shape estimation.

The systems of FIGS. 1 and 2 illustrate aspects of the present invention for estimating the combined response of the transmit and receive pulse-shape filters (pulse-shape response). In the system of FIG. 2, the calculated pulse-shape response coefficients are additionally used as side information in estimating and tracking the channel response. One skilled in the art will recognize that the present invention can also be used to estimate the response of the transmit pulse-shaping filters if the response of the receive pulse-shaping filters is known accurately, and vice versa.

The pulse-shape response estimate can also be used to compensate for pulse-shape distortion due to manufacturing defects or other variations in analog receive filters.

Figure 3:
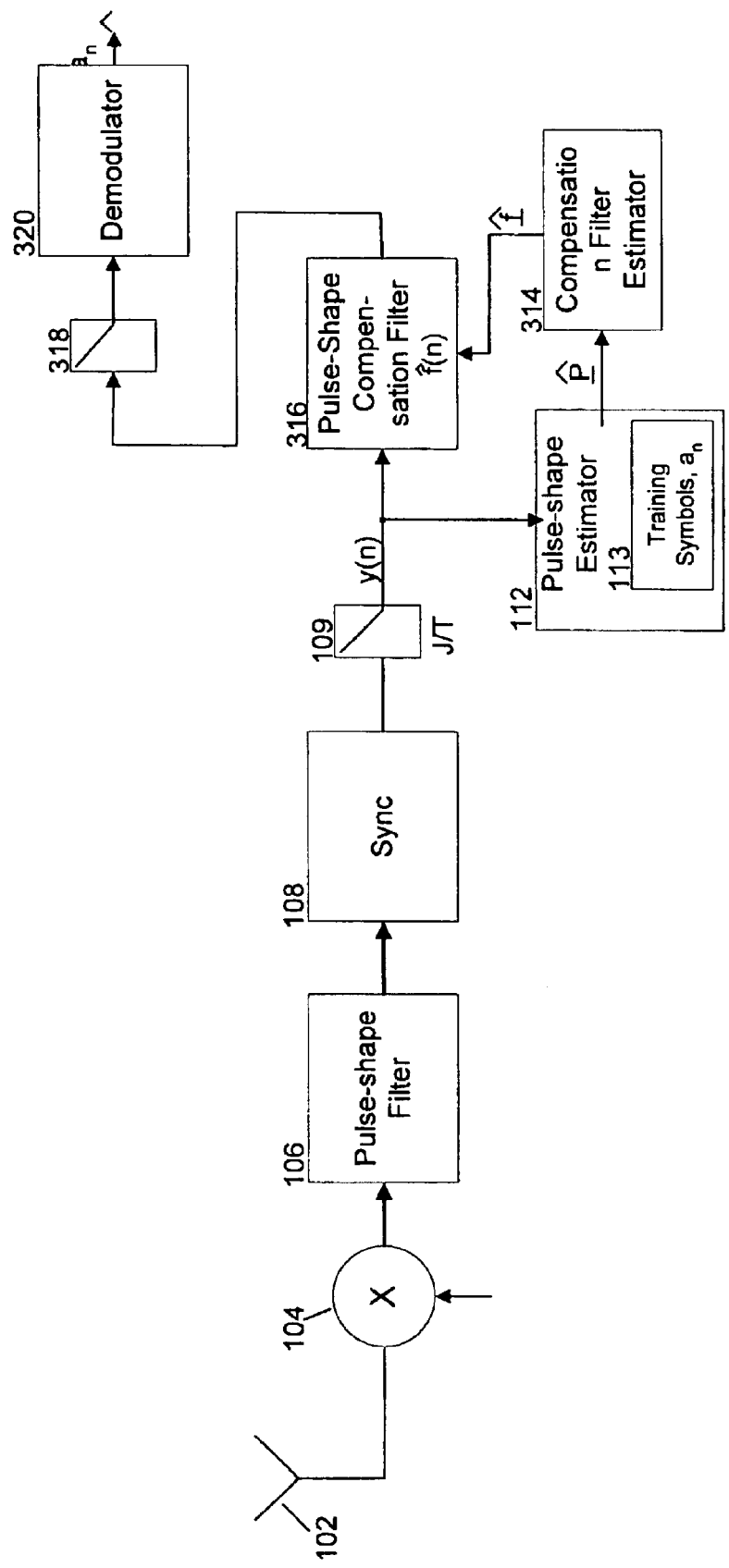
FIG. 3 is a block diagram illustrating a system for performing pulse-shape compensation.

FIG. 3 is a block diagram illustrating such a system for performing pulse-shape compensation.

The system illustrated in FIG. 3 includes a number of elements identical to those described in reference to the systems of FIGS. 1 and 2. In particular, antenna 102, downconverter 104, filter 106, synchonizer 108, and sampler 109 may be implemented as described above. Additionally, pulse-shape estimator 112 calculates the impulse response of the receive filter 106 as described in reference to FIG. 1.

As is further shown in FIG. 3, compensation filter estimator 314 receives the calculated pulse-shape response $$\hat{\underline{p}}$$

from pulse-shape estimator 112. Based on the pulse-shape response $$\hat{\underline{p}},$$

compensation filter estimator 314 calculates the coefficients for a digital FIR (finite impulse response) filter $$\hat{\underline{f}},$$

known as the compensation filter. The received sampled signal y(n) is filtered by compensation filter 316. The filtered signal may then be downsampled by downsampler 318 before passing to demodulator 320, which demodulates the transmitted symbols.

One implementation of compensation filter estimator 314 designs the filter to minimize the squared error between the target pulse shape response, $p^t(n)$, and the compensated pulse-shape response. The squared error may be determined using $$\sum_n |p^t(n) - \hat{f}(n) * \hat{p}(n)|^2 \quad (20)$$

where $\hat{p}(n)$ is the M-tap estimated pulse-shape response from pulse-shape estimator 112 and "*" indicates the convolution operation. The compensation filter that minimizes the squared error is given by $$\underline{f} = R^{-1} \underline{q} \quad (21)$$

where $$\underline{f} = \left[ f\left(\frac{-L+1}{2}\right), \ldots, f\left(\frac{L-1}{2}\right) \right]^T, \text{ for } L \text{ odd}, \quad (22)$$

$\underline{q}$ is an L×1 vector with elements $$q(n) = \sum_{l=0}^{\infty} p^t(n+l)\hat{p}^*(l), \quad n = 0, 1, \ldots, L-1 \quad (23)$$

and R represents an L×L Hermitian Toeplitz matrix with the elements of the first column given by $$r(n) = \sum_{l=0}^{\infty} p^t(n+l)\hat{p}^*(l), \quad n = 0, 1, \ldots, L-1. \quad (24)$$

Compensation filter 316 may be designed to zero-force ISI (inter-symbol interference) caused by pulse-shape distortion by selecting a given sampled Nyquist pulse-shape as the target response. The target response in the case of a symbol-rate pulse-shape response is an impulse function. Symbol-rate pulse-shape compensation eliminates ISI and also whitens the noise if the transmit filter is Nyquist (but the receive filter is not). However, symbol rate filtering does not yield a desired Nyquist pulse-shape $p_d$ (t) if the signal has excess bandwidth; it only forces the compensated pulse-shape response to be zero at symbol intervals except at the sampling time, i.e. $p^t(n) = p^d(nT) = \delta(n)$. To obtain a desired Nyquist pulse-shape, the actual pulse-shape response may be estimated for a sampling rate J/T greater than twice the signal bandwidth, while the compensation filter 314 operates at the same rate. For example, J=2 for square-root-raised-cosine filters with roll-off between 0% and 100%. In this case, the target response may be chosen as $p^t(n) = p^d(nT/2)$.

Those skilled in the art will note that pulse-shape response estimation and determination of the compensation filter could alternatively be implemented by a single component. Moreover, pulse-shape compensation filtering may be applied before synchronization. This may improve synchronization performance, albeit at the cost of additional processing.

In systems that employ full-response signaling such as the D-AMPS system, pulse-shape distortion causes inter-symbol-interference and may also result in the enhancement of adjacent channel interference (ACI). This may lead to a high product failure rate at the factory, thus lowering yield. Pulse-shape compensation can be used to increase factory yield or to relax filter design constraints. The worst-case pulse-shape distortion may be such that it necessitates the use of an equalizer to handle ISI even for flat fading channels. Pulse-shape compensation can additionally be used to enable a conventional single-tap detector to be used with flat fading channels, thus allowing a performance gain as over-modeling of the signal is avoided.

Aspects of the present invention, as described above, were described with reference to a mobile terminal. The term "mobile terminal" may include a cellular radiotelephone with or without a multi-line display; a Personal Communications System (PCS) terminal that may combine a cellular radiotelephone with data processing, facsimile and data communications capabilities; a PDA that can include a radiotelephone, a pager, Internet/intranet access, a Web browser, organizer, calendar and/or a global positioning system (GPS) receiver; and a conventional laptop and/or palmtop receiver or other appliance that includes a radio-telephone transceiver. Mobile terminals may also be referred to as "pervasive computing" devices.

In addition, the present invention was described in the context of GSM and D-AMPS communication systems. While the present invention may be particularly useful for improving the performance of GSM and D-AMPS networks, it should be understood that the principles of the present invention may be applied to any cellular or wireless system utilizing other air interfaces, such as CDMA or FDMA. It should be further understood that the principles of the present invention may be utilized in hybrid systems that are combinations of two or more of the above air interfaces. In addition, a mobile terminal, in accordance with the present invention, may be designed to communicate with a base station transceiver using any standard based on GSM, TDMA, CDMA, FDMA, a hybrid of such standards or any other standard.

The present invention may be embodied as cellular communication systems, circuits, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example, but not limited to: an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

What is claimed is:

1. A system comprising:
   a pulse-shaping filter that filters an input signal corresponding to a received plurality of training symbols and outputs the filtered signal;
   a sampler coupled to receive the filtered signal, sample the received signal, and output a sampled version of the received signal; and
   a pulse-shape estimator coupled to the sampler, the pulse-shape estimator calculating an estimated impulse response of the pulse-shaping filter based on the sampled version of the received signal and on an expected plurality of training symbols.

2. The system of claim 1, wherein the pulse-shaping filter is a transmit pulse-shaping filter, a receive pulse-shaping filter, or a cascade of the transmit and receive pulse-shaping filter.

3. The system of claim 1, wherein the expected plurality of training symbols are pre-stored in the pulse-shape estimator.

4. The system of claim 1, wherein the pulse-shape estimator calculates the estimated impulse response as:

$$\sum_m \hat{\underline{p}}_m (\hat{p}_m(0))^*,$$

where $$\hat{\underline{p}}_m$$

represents the pulse-shape estimate for slot m of a time-division multiple-access signal and is given by $$(A^H A)^{-1} A^H \underline{y}_m,$$

where A is a matrix representing the expected plurality of training symbols, the superscript H represents a Hermitian transpose, and $\underline{y}_m$ represents the sampled version of the received signal.

5. The system of claim 4, further comprising:
a synchronizer coupled between the pulse-shaping filter and the sampler, the synchronizer determining a sampling period for the sampler to sample the filtered signal.

6. The system of claim 5, further comprising:
an interpolator connected to the output of the pulse-shape estimator, the interpolator interpolating the estimated impulse response of the pulse-shaping filter to give the estimated impulse response of the pulse-shaping filter a higher effective sampling rate.

7. The system of claim 6, further comprising:
an antenna for receiving the input signal; and
a downconverter coupled to the antenna, the downconverter converting the received signal to a baseband signal and supplying the baseband signal to the receive filter.

8. The system of claim 1, wherein the system comprises a circuit in a mobile terminal.

9. The system of claim 1, further comprising:
a find compensation filter estimator coupled to the output of the pulse-shape estimator, the find compensation filter calculating coefficients for a digital compensation filter that minimizes the squared error between the estimated impulse response and a desired impulse response; and
a digital filter coupled to the sampler and the find compensation filter, the digital filter filtering the sampled version of the received signal using the calculated filter coefficients.

10. The system of claim 9, further comprising:
a demodulator connected to the output of the digital filter and recovers the symbols in the received signal.

11. A method for calculating an impulse response of a circuit in a mobile terminal comprising:
receiving an input signal;
converting the input signal to a baseband signal;
filtering the baseband signal with a pulse-shaping filter; and
estimating an impulse response of the pulse-shaping filter based on the filtered signal and on an expected signal.

12. The method of claim 11, wherein the input signal is transmitted according to the time division multiple access (TDMA) protocol.

13. The method of claim 11, wherein the expected signal comprises training symbols that are pre-stored on the mobile terminal.

14. The method of claim 11, further comprising:
demodulating the filtered signal to recover symbols transmitted with the input signal.

15. The method of claim 14, wherein the expected signal is derived from the demodulated filtered signal.

16. The method of claim 11, wherein the pulse-shaping filter is adjusted during the manufacturing process based on the estimated impulse response.

17. The method of claim 14, wherein demodulating the filtered signal to recover symbols transmitted with the input signal comprises:
using the estimated impulse response to refine the demodulating.

18. The method of claim 11, further comprising interpolating the estimated impulse response of the pulse-shaping filter to give the estimated impulse response of the receive filter a higher effective sampling rate.

19. The method of claim 11, wherein estimating an impulse response of the receive filter based on the filtered signal and on the expected signal comprises:
calculating $$\sum_m \hat{\underline{p}}_m \hat{p}_m(0)^*, \text{ where } \hat{\underline{p}}_m$$

represents the pulse-shape estimate for slot m of a time-division multiple access signal and is given by $$(A^H A)^{-1} A^H \underline{y}_m,$$

where A is a matrix representing the expected the signal, the superscript H represents a Hermitian transpose, and $\underline{y}_m$ represents the filtered baseband signal.

20. A system for calculating the overall channel response experienced by a mobile terminal comprising:
a pulse-shaping filter that filters an input signal corresponding to a received version of a plurality of training symbols and outputs the filtered signal;
a sampler coupled to receive the filtered signal, sample the received signal, and output a sampled version of the received signal;
a pulse-shape estimator coupled to the sampler, the pulse-shape estimator calculating an estimated impulse response of the pulse-shaping filter based on the sampled version of the received signal, an expected version of the plurality of training symbols, and on medium response coefficients that define characteristics of the medium between the mobile terminal and a transmitting station;
a channel estimator coupled to receive the output of the pulse-shape estimator, the channel estimator calculating the medium response coefficients and calculating an overall channel input response based on the estimated impulse response, the channel estimator transmitting the medium response coefficients to the pulse-shape estimator; and
a demodulator that receives the overall channel input response from the channel estimator and the sampled version of the received signal, the demodulator using the overall channel input response to recover the received signal from the sampled signal.

21. The system of claim 20, wherein the pulse-shaping filter is a transmit pulse-shaping filter, a receive pulse-shaping filter, or a cascade of the transmit and receive pulse-shaping filter.

22. The system of claim 20, wherein the expected version of the plurality of training symbols are pre-stored in the pulse-shape estimator.

23. The system of claim 20, wherein the input signal is transmitted using the time division multiple access (TDMA) protocol.

24. The system of claim 23, wherein the pulse-shape estimator calculates the estimated impulse response for slot m+1 in the TDMA protocol using a least mean squares (LMS) algorithm, the algorithm comprising:

calculating $$\hat{p}_m + \beta \hat{G}_m^H A^H \underline{\varepsilon}_m,$$

where $$\hat{p}_m$$

represents the pulse-shape estimate for slot m of a TDMA signal, $\beta$ represents a step size in the LMS algorithm, $\hat{G}_m$ represents a matrix of estimated medium response coefficients for slot m, and $\underline{\varepsilon}_m$ represents an error signal for slot m.

25. The system of claim 22, further comprising:
a synchronizer coupled between the pulse-shaping filter and the sampler, the synchronizer determining a sampling period for the sampler to sample the filtered signal.

26. The system of claim 25, further comprising:
an antenna for receiving the input signal; and
a downconverter connected to the antenna, the downconverter converting the received signal to a baseband signal and supplying the baseband signal to the pulse-shaping filter.

27. The system of claim 20, wherein the system is a circuit in the mobile terminal.

28. A mobile terminal comprising:
a pulse-shaping filter that filters a signal received by the mobile terminal and outputs a filtered signal;
a sampler coupled to receive the filtered signal, sample the received signal, and output a sampled version of the received signal;
a pulse-shape estimator coupled to the sampler, the pulse-shape estimator calculating an estimated impulse response of the receive filter based on the sampled version of the received signal and on an expected version of the received signal; and
a component coupled to the output of the pulse-shape estimator, the component receiving the estimated impulse response of the pulse-shaping filter from the pulse-shape estimator and using the estimated impulse response to improve the reception of the received signal.

29. The mobile terminal of claim 28, wherein the pulse-shaping filter is a transmit pulse-shaping filter, a receive pulse-shaping filter, or a cascade of the transmit and receive pulse-shaping filter.

30. The mobile terminal of claim 28, wherein the component coupled to the output of the pulse-shape estimator is a channel estimator that calculates an overall channel impulse response based on the impulse response from the pulse-shape estimator.

31. The mobile terminal of claim 30, further comprising:
a demodulator that receives the overall channel input response from the channel estimator and the sampled version of the received signal, the demodulator using the overall channel input response to recover the received signal from the sampled signal.

32. The mobile terminal of claim 28, wherein the component coupled to the output of the pulse-shape estimator comprises:
a compensation filter estimator coupled to the output of the pulse-shape estimator, the find compensation filter calculating coefficients for a digital compensation filter that minimizes the squared error between the estimated impulse response and a desired impulse response; and
a digital filter coupled to the sampler and the compensation filter estimator, the digital filter filtering the sampled version of the received signal using the calculated filter coefficients.

* * * * *